US007011485B2

(12) United States Patent
Henry

(10) Patent No.: US 7,011,485 B2
(45) Date of Patent: Mar. 14, 2006

(54) TILTABLE HAND TRUCK

(76) Inventor: Robert L. Henry, 251 Jeanell Dr., #2, Carson City, NV (US) 89703

( * ) Notice: Subject to any disclaimer, the term of this patent is extended or adjusted under 35 U.S.C. 154(b) by 0 days.

(21) Appl. No.: 10/910,661

(22) Filed: Aug. 3, 2004

(65) Prior Publication Data
US 2005/0013683 A1    Jan. 20, 2005

Related U.S. Application Data

(63) Continuation-in-part of application No. 10/386,090, filed on Mar. 10, 2003, now Pat. No. 6,848,881.

(51) Int. Cl.
*B62B 1/00*    (2006.01)
(52) U.S. Cl. ...................... 414/480; 414/469; 414/482; 280/47.12; 280/47.131
(58) Field of Classification Search ........... 280/47.131, 280/47.12, 30; 414/469, 467, 480, 482
See application file for complete search history.

(56) References Cited

U.S. PATENT DOCUMENTS

| | | | |
|---|---|---|---|
| 1,706,253 A | 3/1929 | Raymond | |
| 2,607,502 A * | 8/1952 | Willitts | 414/469 |
| 2,696,928 A * | 12/1954 | Faircloth et al. | 414/469 |
| 2,860,800 A | 1/1958 | Wilson et al. | |
| 3,486,252 A * | 12/1969 | Daniels | 37/270 |
| 4,155,678 A * | 5/1979 | Lehman et al. | 414/483 |
| 4,222,698 A * | 9/1980 | Boelter | 414/477 |
| 4,429,758 A * | 2/1984 | Meshulam | 180/19.3 |
| 5,474,416 A | 12/1995 | Rogge et al. | |
| 5,536,131 A * | 7/1996 | Behr | 414/495 |
| 5,688,099 A | 11/1997 | Fischer | |
| 5,857,825 A * | 1/1999 | Rice | 414/483 |
| 6,193,319 B1 * | 2/2001 | Kielinski | 298/2 |

* cited by examiner

*Primary Examiner*—Douglas Hess
(74) *Attorney, Agent, or Firm*—David R. Preston & Associates, APC; M. Reza Savari

(57) ABSTRACT

The present invention provides an improved hand truck having a tiltable platform for carrying heavy objects, which is safe to use and easily maneuverable, and requires the minimum amount of energy required for movement of heavy objects. The present invention provides a tiltable hand truck with minimal risk of injury and minimal risk of accidents for the operator while operating the present invention. The present invention provides a method for transporting a heavy load using a tiltable platform, which makes it easy for heavy objects to be transported with minimal effort.

8 Claims, 8 Drawing Sheets

TILTABLE HAND TRUCK

CROSS REFERENCE TO PREVIOUS APPLICATIONS

This application is a continuation in part application and claims benefit of priority to U.S. Utility patent application Ser. No. 10/386,090, filed Mar. 10, 2003, and entitled "Tiltable Hand Truck", now U.S. Pat. No. 6,848,881 which is incorporated by reference herein in its entirety.

BACKGROUND

The present invention relates to a tiltable hand truck having a tiltable platform for the loading of heavy objects further having a steering assembly that allows for the movement of the heavy object in any direction. The present invention is particularly adaptable to lift any object that can be tipped or tilted to facilitate loading onto the tiltable platform.

A variety of hand trucks and dollies for movement of heavy objects are commercially available. Hand trucks and dollies can be used for a variety of purposes, such as transportation of heavy plant pots, movement of heavy boxes in warehouses, movement of heavy furniture and equipment, and generally facilitating the movement of heavy articles from one point to another. Many of these hand trucks and dollies are awkward to maneuver and exert much strain on the operator's joints, back, and muscles. Many of the commercially available hand trucks and dollies can cause severe injuries when improperly handled or improperly balanced. The present invention addresses these problems, and provides related benefits.

SUMMARY OF THE INVENTION

The present invention relates to a tiltable hand truck that is safe to use and easily maneuverable, which requires the minimum amount of energy required for movement of heavy objects. The present invention provides a tiltable hand truck with minimal risk of injury and minimal risk of accidents for the operator while operating the present invention. This is because unlike existing dollies where the operator's body and strength acts to balance the weight of the object to be moved, the present invention required minimum energy to load an object and minimum effort and skill to maneuver.

One objective of the present invention is to provide an improved hand truck with a tiltable platform that is particularly adaptable to lift any object that can be tipped or tilted to facilitate loading onto the tiltable platform. The tilting of a heavy object that is to be moved requires much less energy than lifting the object. Tipping or tilting the object to be moved, exposes its underside, allowing the tiltable platform of the present invention to engage the object and act as a receiving dock for the tilted object. Moving the tiltable platform back to level position causes the weight of the object to balance at the pivot point and be loaded onto the tiltable platform with ease and without much effort by the operator. One advantage of the present invention is that the tiltable platform lifts into position the object to be moved in an upright position, which can then be transported and steered away to the location of choice.

Another objective of the present invention is to provide a hand truck with preferably a latchable tilting platform that can be tilted such that one end swings downwards to the ground and the opposite end swings upwards forming an incline. The end that swings downward can be positioned such that the topside of the tilting platform comes into contact with the bottom side of the tilted object to be moved. When the platform is tilted to level position, the object is automatically loaded onto the tilting platform by way of its own weight. The tiltable platform can then be locked into position by the latch in order to avoid further movement of the tiltable platform. Preferably, the present invention provides means for tilting the tiltable platform into loading position. The tilting can be achieved, for example, by attaching a raising bar to the stop shaft situated underneath the tiltable platform such that when the stop shaft is rotated by means of a handle, the raising bar rotates with the stop shaft and raises the tiltable platform. The tiltable platform is designed to tilt by pivoting means. The pivoting means is preferably attached to the midpoint of the tilting platform, but the pivoting means may be attached to the underside of the tilting platform in an off-centered configuration in certain embodiments of the present invention depending on the type and weight of the load to be moved.

Another objective of the present invention is to provide a hand truck with a plurality of wheels that allow for even distribution of the weight of the object to be moved and to facilitate the maneuvering of the loaded hand truck.

Yet another objective of the present invention is to provide for a tiltable hand truck with a steering assembly, which steering assembly is rotatably connected to the frame that houses the tiltable platform. This configuration facilitates precise locomotion and is highly maneuverable.

Another objective of the present invention is to provide a method for transporting an object from one place to another comprising the steps of providing a rigid frame having three sides an opening in front, providing means for locomotion such as wheel, tires, or other means capable of facilitating the locomotion of the device and load, preferably providing means for steering the device, and providing a pivoting carrying platform attached to said rigid frame. This method for transporting objects includes placing an object on the pivoting platform while the pivoting platform is in the loading position, that is the side of the pivoting platform near the open front is pivoted downwards to the ground, and the opposite side has pivoted upward forming an incline. In this position the object to be moved is tilted or tipped to one side so as to expose the underside of the object, and allow the pivoting platform access to the underside of the object. Once the underside of the object is contacted to the topside of the pivoting platform in the load position, the object to be moved is tilted back or untipped onto the carrying platform bringing the pivoting carrying platform to a level position, where a stop shaft halts further movement of the pivoting carrying platform and the loaded object.

Further objectives and advantages of the present invention will become apparent as the description proceeds. To gain a full appreciation of the scope of the present invention, it will be further recognized that various aspects of the present invention can be combined to make desirable embodiments of the invention.

Unless defined otherwise, all technical and scientific terms used herein have the same meaning as commonly understood by one of ordinary skill in the art to which this invention belongs. Where a term is provided in the singular, the inventor also contemplates the plural of that term. The nomenclature used herein and the procedures described below are those well known and commonly employed in the art.

DETAILED DESCRIPTION OF THE INVENTION

Figure 1:
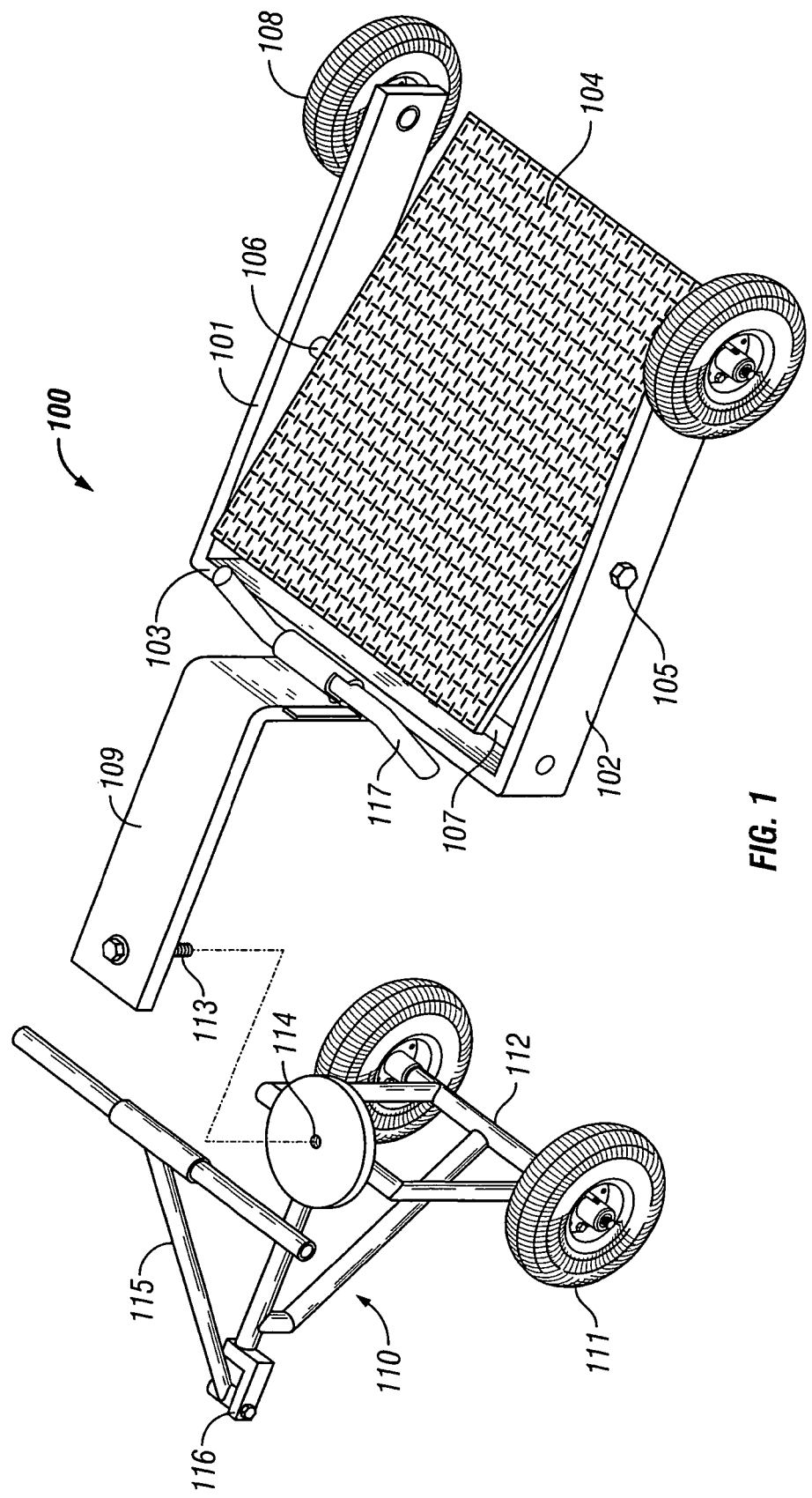
FIG. 1 is a is a top/side prospective view of the tiltable hand truck with the carrying assembly and the steering assembly in detached configuration with the tiltable platform positioned for receiving an object to be moved.
Figure 2:
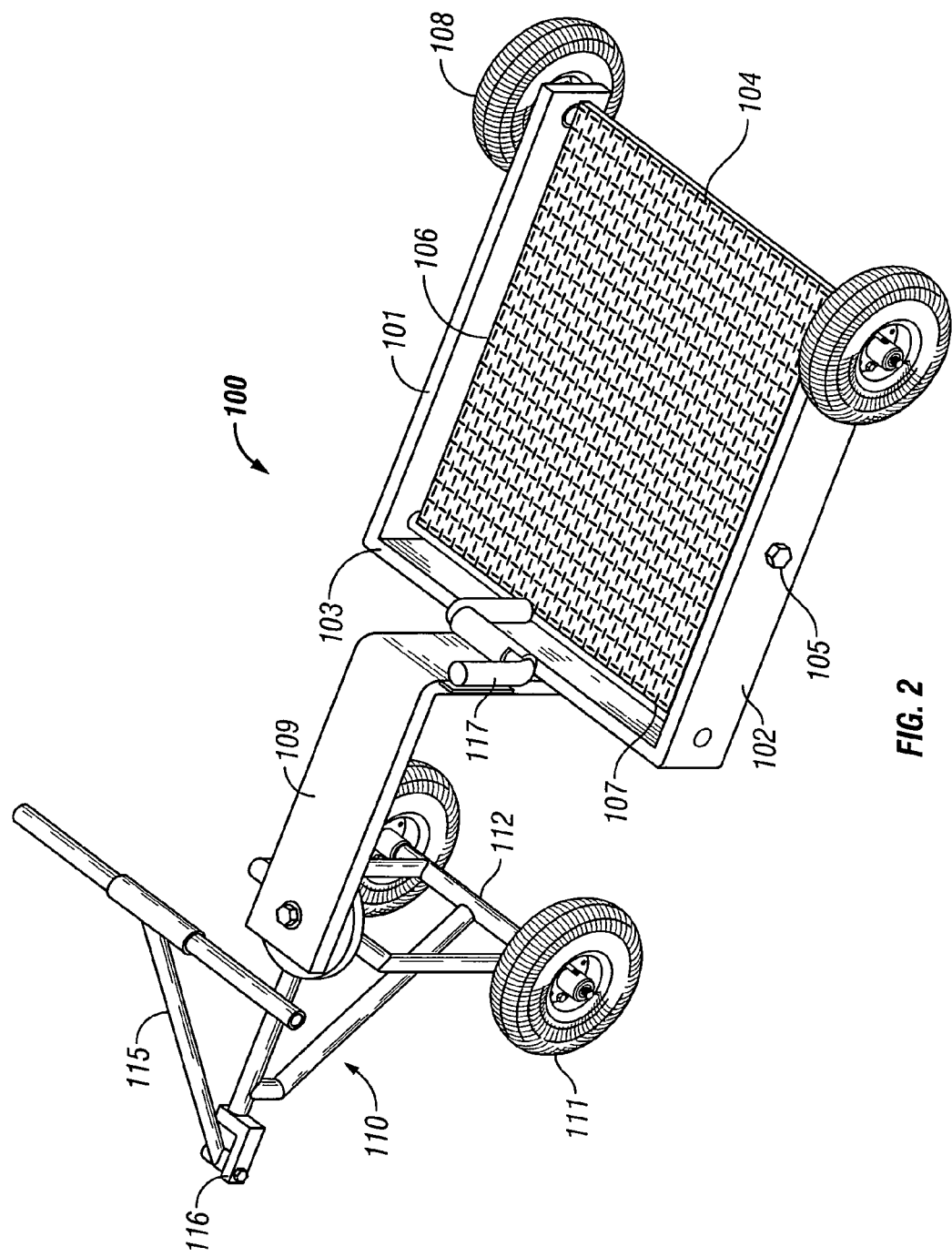
FIG. 2 is a is a top/side prospective view of the tiltable hand truck
Figure 3:
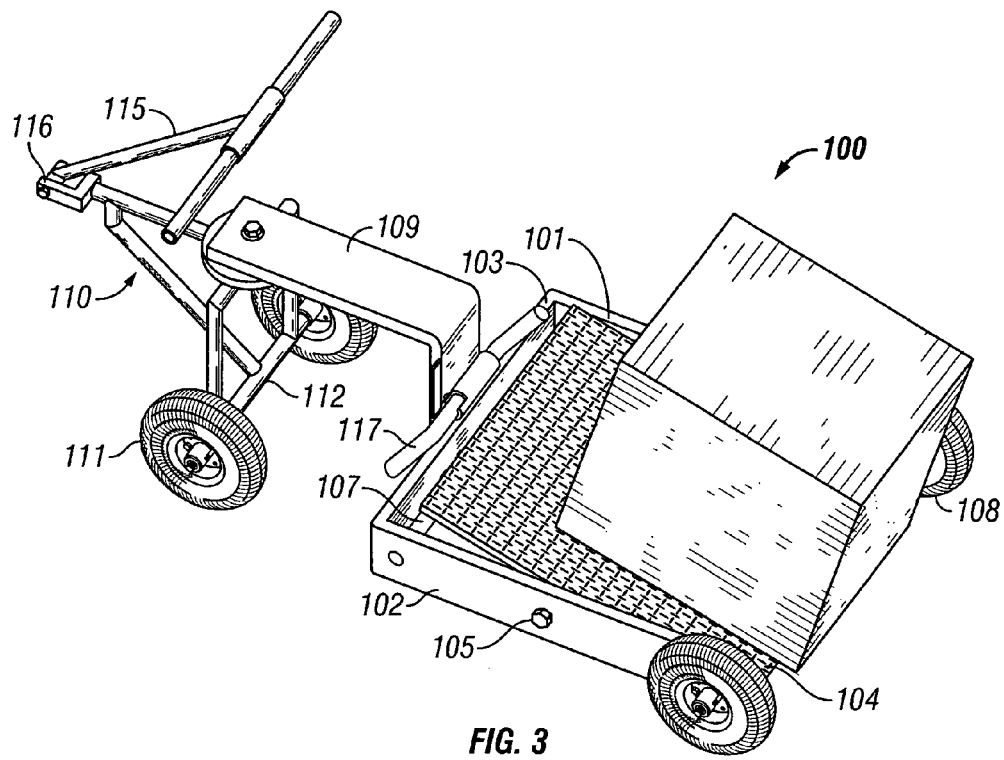
FIG. 3 is a top/side prospective view of the tiltable hand truck with the tiltable platform positioned for receiving an object to be moved showing a heavy object being loaded to be transferred to a new location.
Figure 4:
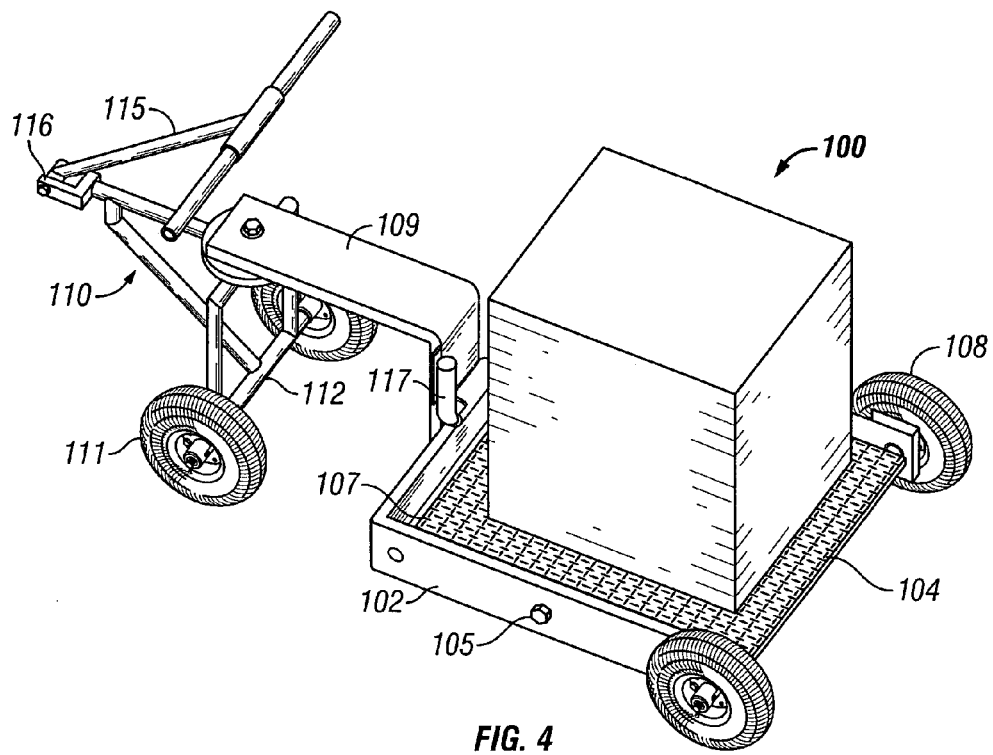
FIG. 4 is a top/side prospective view of the tiltable hand truck with the tiltable loaded with a heavy object to be transferred to a new location.
Figure 5:
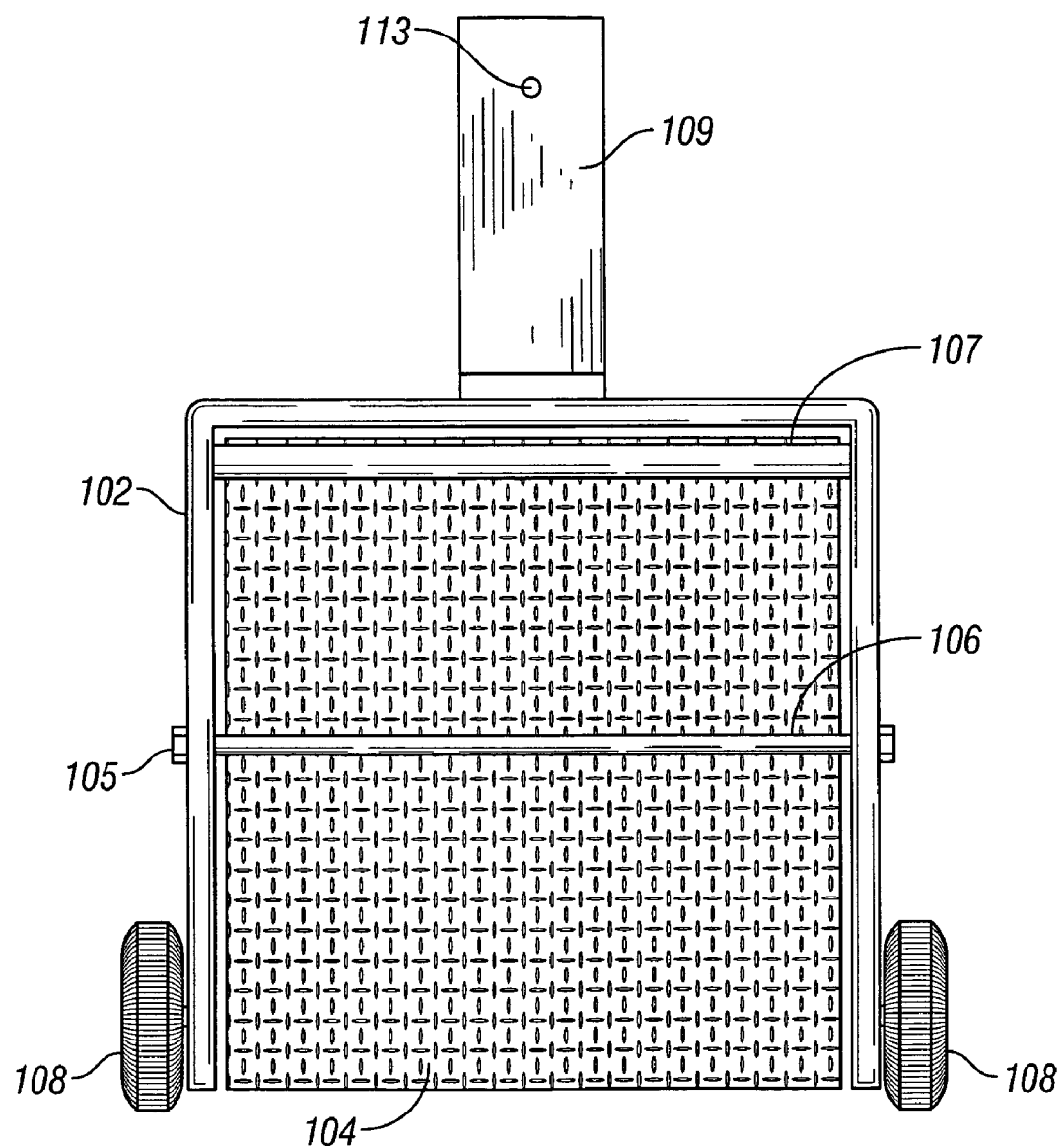
FIG. 5 is a bottom side view of the tiltable hand truck showing the details of the underside of the tiltable hand truck with stop shaft and pivoting means.
Figure 6:
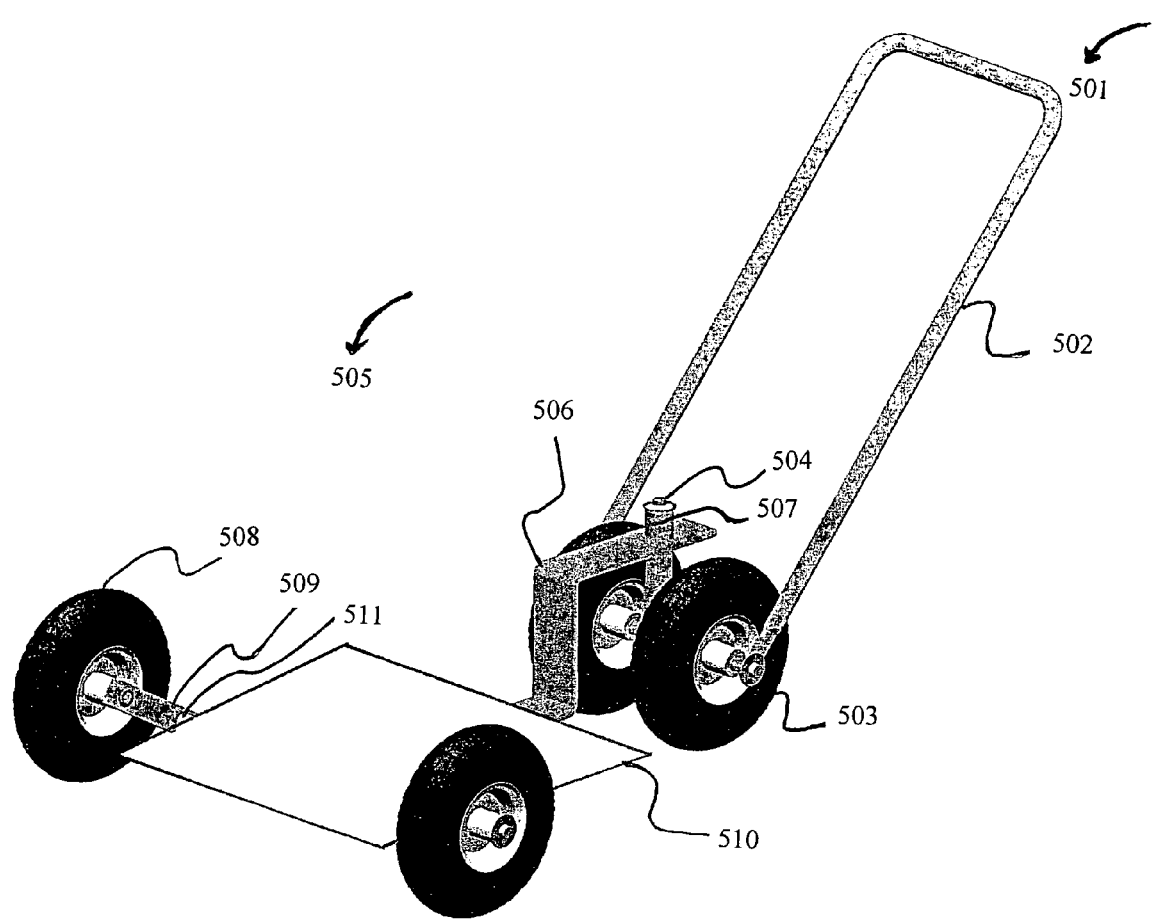
FIG. 6 is a top/side prospective view of a tiltable hand truck with carrying assembly and steering assembly.
Figure 7:
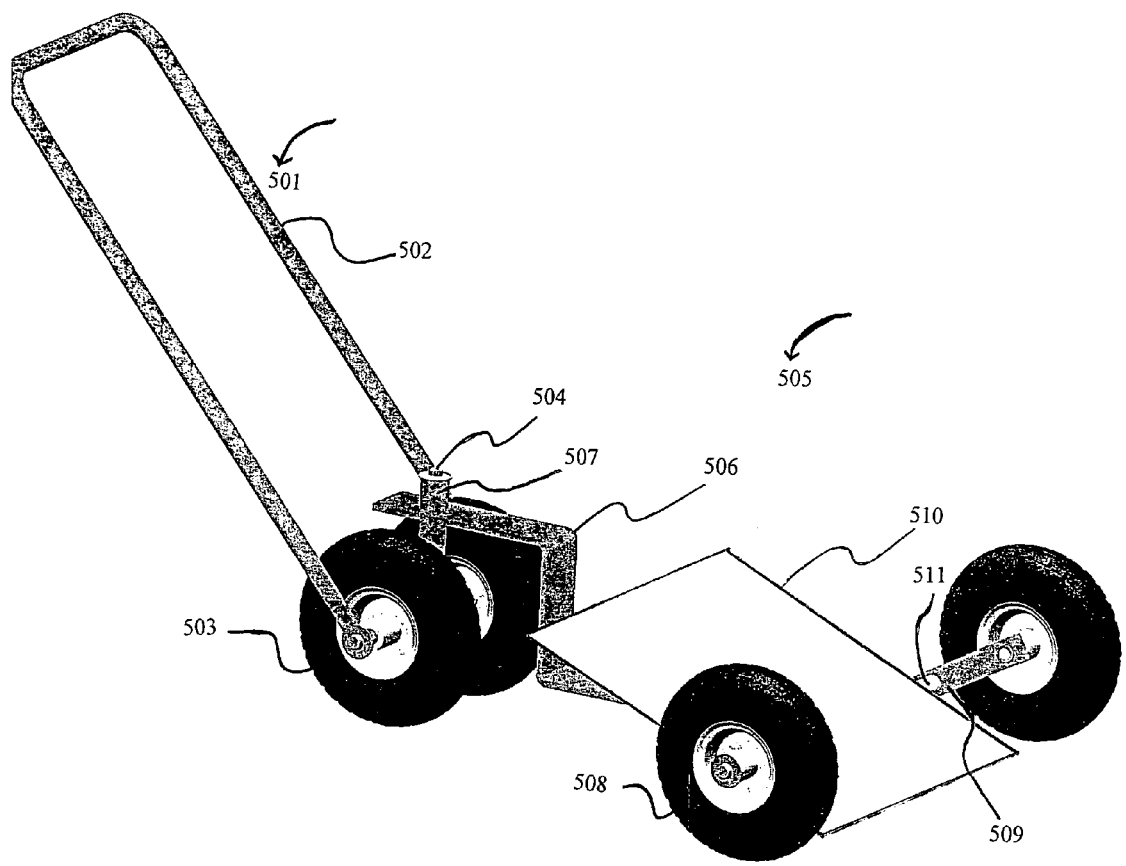
FIG. 7 is a is a top/side prospective view of a tiltable hand truck with carrying assembly and the steering assembly with the tiltable platform positioned for receiving an object to be moved.

Referring to FIGS. 1–4, the tiltable hand truck comprises a substantially U-shaped frame 100, having a right side member 101 and a left side member 102 and a rear member 103, a tiltable platform 104 is pivotally attached at one side to the right side member 101 and at the other side to the left side member 102 by way of a pivot 105, which is fixedly attached at one side to the right side member 101 and at the other side to the left side member 102. The tiltable platform 104 is fixedly attached to a hollow sleeve tube 106, which acts as the sleeve for the pivot pin 105, whereby the tiltable platform 104 can easily pivot about the pivot pin 105. A stop shaft 107 is fixedly attached at one side to the right side member 101, and at the other side to the left side member 102 near the rear member 103. A plurality of wheels 108 are provided, preferably in pairs, each axially attached to the right side member 101 or the left side member 102. A connecting member 109, preferably attached fixedly to the rear member 103 at one end and releasably and rotatably connected to a steering assembly 110, comprising steering wheels 111 axially attached to a steering shaft 112, said steering shaft releasably and rotatably connected to the connecting member 109, preferably by way of pin 113 and socket 114. A handle 115, preferably attached to the steering shaft 112. The handle may preferably further comprise a multidirectional moveably joint 116 to facilitate steering and operation. The tiltable hand truck may preferably further comprise a latch 117, preferably attached to said connecting member 109 wherein the tiltable platform 104 can be releasably latched in place in order to avoid further movement of the tiltable platform 104.

The substantially U-shaped frame 100 can be manufactured from any rigid material, preferably metals such as aluminum, steel, stainless steel, etc. However, certain embodiments of the present invention may be manufactured from rigid plastics, rubber, woods, carbon composite material, or any variation thereof . The U-shaped frame 100 can be made by attaching three pieces of steel together to obtain the desired shape with a right side member 101 and a left side member 102 and a rear member 103. In a preferred embodiment the U-shaped frame 100 is manufactured by bending a long piece of steel at its proximal ends in order to obtain the desired shape with a right side member 101 and a left side member 102 and a rear member 103. The hollow sleeve tube 106 is preferably welded to the tiltable platform 104 nearly at the dividing line of the tiltable platform 104. The pivot pin 105 is inserted into the hollow sleeve tube 106, and is preferably welded at one end to the right side member 101 and at the other end to the left side member 102. However, the pivot pin 105 can be attached to the side members 101 and 102 by other attaching means such as bolts. The stop shaft 107, is preferably welded at one end to the right side member 101 and at the other end to the left side member 102 near the rear member 103. However, other means of attachments such as bolts may be used. To facilitate smooth locomotion of the tiltable hand truck, especially when carrying a load, a plurality of wheels 108 are provide. The wheels 108 can be made of any type of material, but preferably, the wheels 108 are rubber wheels and are positioned in pairs, each axially attached to the side members 101 and 102, and more preferably the wheels 108 are axially attached outwardly so as not to interfere with any object that is being moved. A connecting member 109, preferably in a goose neck configuration, connects the substantially U-shaped frame 100 to the steering assembly 110.

The steering assembly 110 can be manufactured from any rigid material, preferably metals such as aluminum, steel, stainless steel, etc. However, certain embodiments of the present invention may be manufactured from rigid plastics, rubber, or wood. At least one steering wheel 111, and preferably two steering wheels 111 are provided, each axially attached to the steering shaft 112. In the embodiment where only one steering wheel 111 is provided, the steering wheel 111 is axially attached to each proximal ends of the steering shaft 112 in an inverted U-format. In embodiments with more that one steering wheel 111, each steering wheel 111, is axially attached to each other at one side, and a proximal end of the steering shaft 112 at the other side forming a stretched out inverted U-format. In a preferred embodiment the steering shaft is releasably and rotatably connected to the connecting member 109, and said connecting member 109 is fixedly attached to said rear member 103. However, other embodiments are considered, such as the steering shaft 112 being fixedly attached to the connecting member 109, and the connecting member 109 being releasably and rotatably attached to the rear member 103, or the steering shaft 112 being fixedly attached to the connecting member 109, and the connecting member 109 being fixedly attached to the rear member 103, or the steering shaft 112 being releasably and rotatably attached to the connecting member 109, and the connecting member 109 being releasably and rotatably attached to the rear member 103. A preferred means of releasably and rotatably attachment is by way of pin 113 and socket 114, however other means are considered such as ball hitch and ball hitch receiver or a hook mechanism. In a preferred embodiment, a handle 115 is provided, said handle being fixedly attached to the steering shaft 112. In the preferred embodiment the handle 115 further comprises a multidirectional movable joint 116 to facilitate steering and operation. In a preferred embodiment of the present invention a latch 117 is provided, said latch 117 being fixedly attached to the preferred goose neck shaped connecting member 109. However, the latch 117 may also be fixedly attached to any of the side members 101, 102, or 103. The latch 117 releasably locks the tiltable platform 104 in a level position after the object to be moved has been loaded onto the tiltable platform 104 in order to avoid further movement of the tiltable platform 104.

Another embodiment of the present invention is to provide a method for transporting an object from one place to another comprising the steps of providing a rigid frame 100 having a right side member 101, a left side member 102, and a rear member 103 and open in front, providing means for locomotion 108, 111 such as wheel, tires, or other means capable of facilitating the locomotion of the device and load, preferably providing means for steering the device 110, and providing a pivoting carrying platform 104 attached to said rigid frame 100. This method for transporting objects includes placing an object on the pivoting platform 104 while the pivoting platform is in the loading position, that is the side of the pivoting platform near the open front is pivoted downwards to the ground, and the opposite side has pivoted upward forming an incline. In this position the object to be moved is tilted or tipped to one side so as to expose the underside of the object, and allow the pivoting platform 104 access to the underside of the object. Once the underside of the object is contacted to the topside of the pivoting platform 104 in the load position, the object to be moved is tilted back or untipped onto the carrying platform 104 bringing the pivoting carrying platform 104 to a level position, where a stop rod 107 halts further movement of the pivoting carrying platform 104 and the loaded object.

DETAILED DESCRIPTION OF OTHER EMBODIMENTS OF THE INVENTION

Referring to FIGS. 5–12, the tiltable hand truck comprises a steering assembly 501 including a handle member 502 and a plurality of steering wheels 503, preferably in pairs, which are spaced apart and connected to each other by a wheel axle. The wheel axle may preferably be used to connect the steering wheels 503 of the steering assembly 501 to the handle member 502 for moving and steering the tiltable hand truck. For example, the handle member 502 may be connected to the wheel axle at either one or both ends of the wheel axle. At one location on the wheel axle, preferably the center, a connecting pin 504 is fixedly attached to the wheel axle. The connecting pin 504 can be adapted to releasably and rotatably connect or engage the steering assembly 501 with the carrying assembly 505. A preferred means of releasable and rotatable attachment is by way of connecting pin 504, however other means are also considered, such as for example, ball hitch and ball hitch receiver or a hook mechanism.

Figure 8:
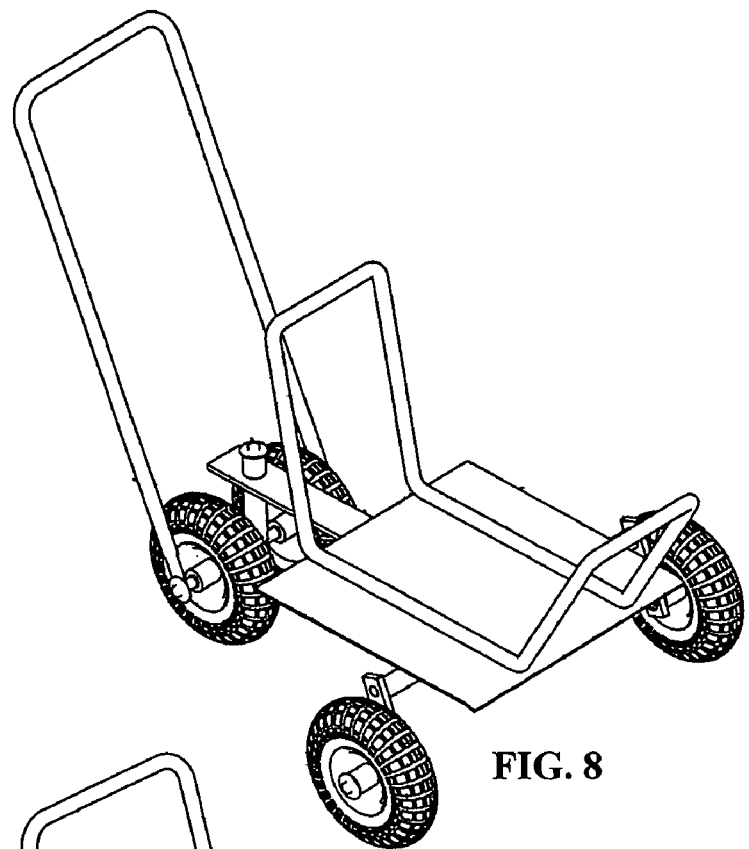
FIG. 8 is a is a top/side prospective view of a tiltable hand truck with carrying assembly having a horizontal configuration with the tiltable platform having a special attachment to assist in loading and unloading and/or for specific loads to be carried and steering assembly.
Figure 9:
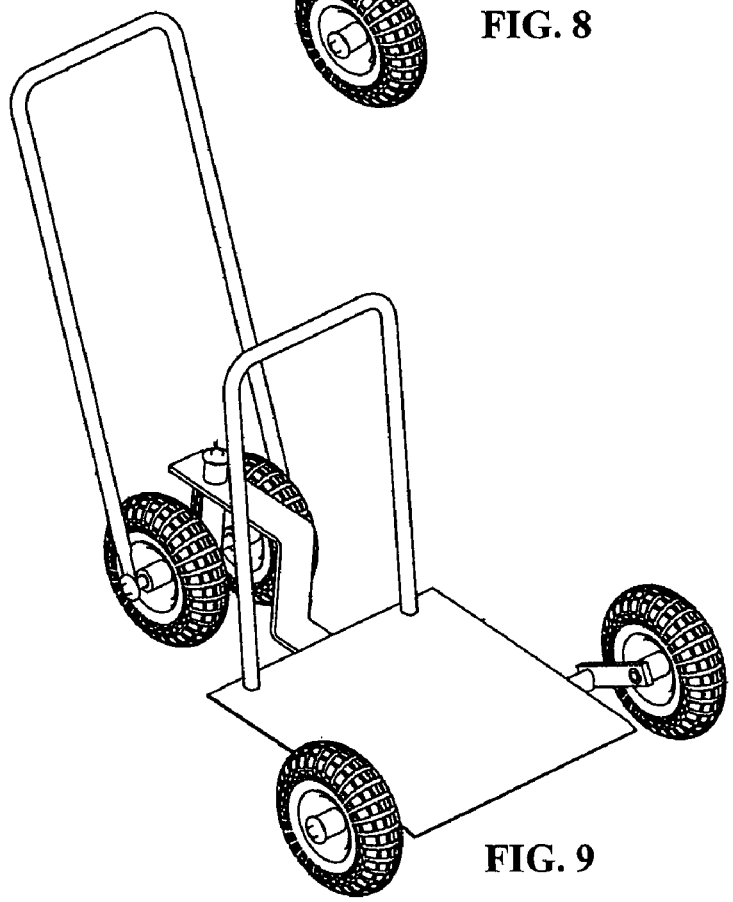
FIG. 9 is a is a top/side prospective view of a tiltable hand truck with carrying assembly having a goose neck configuration with the tiltable platform a special attachment to assist in loading and unloading and/or for specific loads to be carried and steering assembly.
Figure 10:
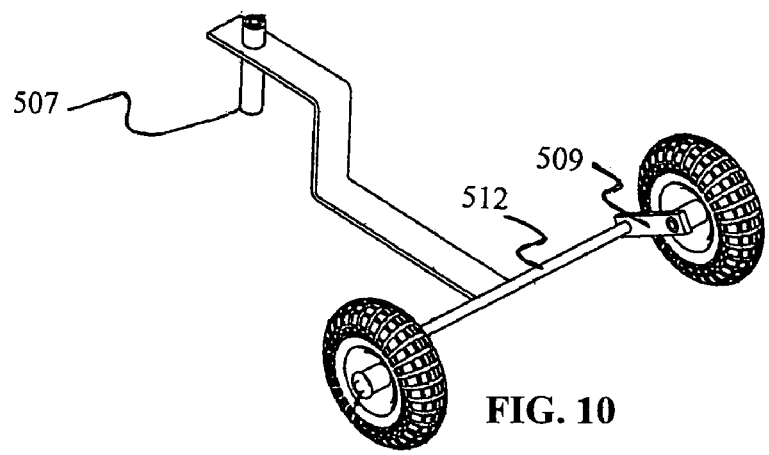
FIG. 10 is a is a top/side prospective view of a carrying assembly having a goose neck configuration.
Figure 11:
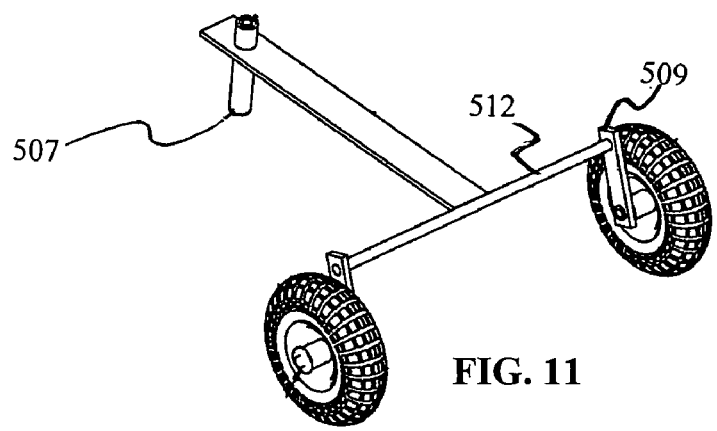
FIG. 11 is a is a top/side prospective view of a carrying assembly having a horizontal configuration.
Figure 12:
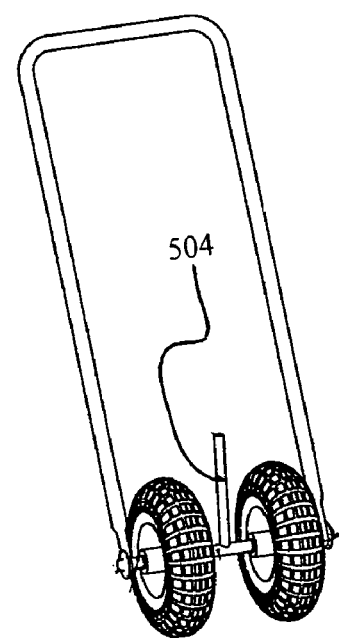
FIG. 12 is a is a top/side prospective view of a steering assembly having a steering pin for rotatable attachment to the carrying assembly.

The carrying assembly 505 includes a connecting member 506 which includes a receiver, such as for example, a socket member 507 at one end that can be preferably adapted to releasably and rotatably accept the connecting pin 504 of the steering assembly 501. The shape of the connecting member 506 may be formed in different configurations for adaptation to different uses of the tiltable hand truck, such as for example, the connecting member 606 may be in the shape of a goose-neck, as shown in FIG. 9, in order to bring the tiltable platform closer to the ground, or it may be shaped in a horizontal configuration, as shown in FIG. 8, for other purposes. The connecting member 506 includes or may be attached to an axle 512 at one end opposite of the socket member 507 for attachment of a plurality of carrying wheels 508. The carrying assembly includes a plurality of carrying wheels 508, preferably in pairs. The carrying wheels 508 are preferably connected to the axle 512 of the connecting member 506 via a extending member 509 for each carrying wheel.

Each extending member 509 is connected at one end to the axle 512 of the connecting member 506 and axially connected at the other end to a carrying wheel 508. The extending members 509 act to provide optimal positioning of the tiltable platform 510 with respect to the ground and/or with respect to the size and position of the objects to be moved. The extending members 509 may be fixedly attached or may be attached in such a way as to allow for changes of angle, but preferably the extending members 509 are fixedly attached to the axle 512 of the connecting member 506 at an angle of 30° from the level plane of the tiltable platform. The extending members 509 may include multiple position of attachment to the carrying wheels 508 or the axle 512 of the connecting member 506 for fine tuning the length of the extending members for optimal positioning of the tiltable platform 501 with respect to the ground and/or with respect to the size and position of the objects to be moved.

The carrying assembly 505 includes a tiltable platform 510 which sits atop and is balanced by the connecting member 506. The tiltable platform 510 includes a front, a back, a top side, and an underside which includes a pivoting means 511. The pivoting means 511 may be any suitable pivoting means, such as for example, hollow sleeve or apperture and pivot pin or inverted half-pipe members attached to the underside of the tiltable platform 510. The pivoting means 511 is preferably attached to the underside of the tiltable platform 510 in an off-centered configuration. Preferably, the pivoting means 511 is attached to the underside of the tiltable platform at about one-third (⅓) of the length of the surface length of the tiltable platform 510, wherein the front end of the tiltable platform 510 is positioned closer to the pivoting means 511 than the back end of the tiltable platform 510. The tiltable platform is able to engage the axis 512 of the connecting member 506 in such a way that the tiltable platform is able to sit atop and be balanced by the connecting member 506 and easily pivot about the axis 512 of the connecting member 506. The pivoting means may be preferably made of two separate elements, such as for example, two inverted half-pipe members that are each connected to the under side of the tiltable platform 510 at the left and right sides. The two inverted half-pipe members may be flushed with the left and right side of the tiltable platform, or they may extend beyond or be shorter than the right and left sides of the tiltable platform. By way of example, the two inverted half pipes may extend beyond the right and left sides of the tiltable platform and are able to releasably and rotatably engage and pivot about the axle 512 of the connecting member 506.

In order to transport objects, the object may be placed on the tiltable platform 510 while the tiltable platform 510 is in the loading position, meaning that the front side of the tiltable platform 510 which is near the axle 512 of the connecting member 506 is pivoted downward to the ground forcing the opposite back side of the tiltable platform 510 to pivot upward forming an incline. The tiltable platform 510 may be pivoted downward by the operator of the hand truck, or the tiltable platform 510 may be forced downward by pressing the front end of the tiltable platform 510 against the object to be moved, which forces the tiltable platform 510 to pivot downward into the loading position. Preferably, the front of the tiltable platform 510 which engages an object to be moved includes an angled lip for facilitating the pivoting of the tiltable platform 510 when pressed against the object to be moved. Preferably, the object to be moved is tilted or tipped to one side so as to expose the underside of the object, and allow the tiltable platform 510 access to the underside of the object. Once the underside of the object contacts to the topside of the tiltable platform 510 in the loading position, the object to be moved is tilted back or untipped onto the tiltable platform 510 bringing the tiltable platform 510 to a level position, where the tiltable platform sits atop and is balanced by the connecting member 506 which halts further movement of the tiltable platform 510 and the loaded object.

The parts of the tiltable had truck can be manufactured from any rigid material, preferably metals, such as for example, aluminum, steel, stainless steel, etc. However, certain embodiments of the present invention may be manufactured from rigid plastics, rubber, woods, carbon composite material, or any variation thereof. The handle member 502 of the steering assembly 501 can be any suitable handle, such as for example, a single straight handle or a U-shaped handle with each end of the U being attached to each end of the wheel axle of the steering assemble 501. The steering wheels 503 and the carrying wheels 508 can be made of any type of suitable material, preferably the wheels of the present invention are rubber wheels and are positioned in pairs and axially attached such that the wheel can freely rotate about the axis. The carrying wheels 508 are preferably axially attached outwardly to the extending members 509 such that the wheels are away from the carrying assembly 505 so as not to interfere with any object that is being placed on the tiltable platform 510.

The steering assembly 501 includes a connecting pin 504 is preferably in a substantially upright position which is perpendicular to the ground, and can be adapted to releasably and rotatably connect or engage the steering assembly 501 with the carrying assembly 505 by way of a receiving member, such as for example, a socket member 507 of the carrying assembly 505. The carrying assembly 505 includes a connecting member 506 which can be in various shapes and configurations to suit a particular purpose or load requirement, such as for example, a horizontal configuration or a goose neck configuration. The connecting member 506 includes a socket member 507 at one end that can be preferably adapted to releasably and rotatably accept the connecting pin 504 of the steering assembly 501, wherein the connecting pin 504 can rotate freely within the socket member 507 to allow for steering the tiltable hand truck. An operator of the hand truck can steer the hand truck by pushing or pulling the handle member 502 of the steering assembly 501 which is connected to the wheel axle of the steering assembly 501 in any direction causing the wheel axle and therefore the steering wheels 503 of the steering assembly 501 to turn and change the direction of the tiltable hand truck.

An important aspect of the present invention is the pivoting means 511 of the tiltable platform 510, which is preferably attached to the underside of the tiltable platform 510 in an off-centered configuration. This off-centered position of the pivoting means 511 allows for rapid and efficient loading of the tiltable hand truck by making it easier to configure the tiltable hand truck into the loading position. The tiltable hand truck may be put into loading position by way of the operator of the tiltable hand truck or by way of the object to be moved itself. The tiltable platform 510 may be pivoted downward by the operator of the hand truck, or the tiltable platform 510 may be forced downward by pressing the front end of the tiltable platform 510 against the object to be moved, which forces the tiltable platform 510 to pivot downward into the loading position. The tiltable platform 510 may include various attachments or additions for specialized purpose or to help loading, unloading, and/or transporting objects. By way of example and without limitation, the tiltable platform 510 can include a specialized attachment, as shown in FIG. 8, for carrying a particularly shaped object, or the tiltable platform 510 can include a support attachment as shown in FIG. 9 for carrying larger objects that are hard to balance. Such attachments can also help loading and unloading object from the tiltable platform 510 by allowing the operator to manipulate the tiltable platform 510 through the attachment using his hands and without having to manipulate the tiltable platform 510 directly.

Another embodiment of the present invention is to provide methods for transporting an object from one place to another comprising the steps of providing a steering assembly 501 including a plurality of steering wheels 503 connected by way of a wheel axle having a connecting pin 502, and a handle member connected to the wheel axle for steering. The methods of the present invention also include providing a carrying assembly 505 including a connecting member 506 having a socket member 507 and an axle 512 that is able to releasably and rotatably engage the connecting pin 504 of the steering assembly 501. The Carrying assembly also includes tiltable platfrom 510 with a pivoting mean, wherein the tiltable platform 510 sits atop and is supported by the connecting member 506 and the pivoting mens that is able to releasably engage and pivot about the the axle 512 of the connecting member 506. Whereby a load can be placed on the tiltable platform while the load is partially on the ground and partially on the tiltable platform, and loading is accomplished when the tiltable platform is pivoted back to level position placing the load onto the tiltable platform, which sits atop and is balanced by the carrying member 506.

All headings are for the convenience of the reader and should not be used to limit the meaning of the text that follows the heading, unless so specified. Various changes and departures may be made to the present invention without departing from the spirit and scope thereof. Accordingly, it is not intended that the invention be limited to that specifically described in the specification or as illustrated in the drawings, but only as set forth in the claims.

What is claimed is:

1. A tiltable hand truck comprising:
    a carrying assembly comprising tiltable platform;
    a connecting member including a receiving member and an axle including an extending member at each end; and
    a plurality of carrying wheels each being axially attached to each of said extending members of said axle of said connecting member;
        wherein said tiltable platform sits atop of and is supported by said connecting member and engages said connecting member by way of pivoting means, said pivoting means being able to engage and pivot about said axle of said connecting member; and a steering assembly comprising a handle member, a plurality of steering wheels, and means to releasably and rotatably connect to said receiving member of said carrying assembly.

2. The tiltable hand truck of claim 1, wherein said pivoting means comprises one or more half-pipe members attached to said underside of said tiltable platform, said one or more half-pipe members being able to releasably and rotatably attache to and pivot about said axle of said connecting member.

3. The tiltable hand truck of claim 1, wherein said extending means are angled 30° above the level plane of said tiltable platform.

4. The tiltable hand truck of claim 3, wherein said extending members comprise means for length adjustment.

5. The tiltable hand truck of claim 4, wherein said extending members comprise means for angle adjustment.

6. The tiltable hand truck of claim 1, wherein each of said carrying wheels of said carrying assembly is axially attached outwardly to each of said extending members.

7. The tiltable hand truck of claim 1, wherein said steering assembly and said carrying assembly are connected by means of a connecting pin and a receiving socket.

8. The tiltable hand truck of claim 1, wherein said connecting member comprises a goose-neck configuration.

* * * * *